Sept. 7, 1943. C. F. LEATHERS ET AL 2,329,122
WELDING METHOD AND APPARATUS
Filed Jan. 17, 1941   2 Sheets-Sheet 2

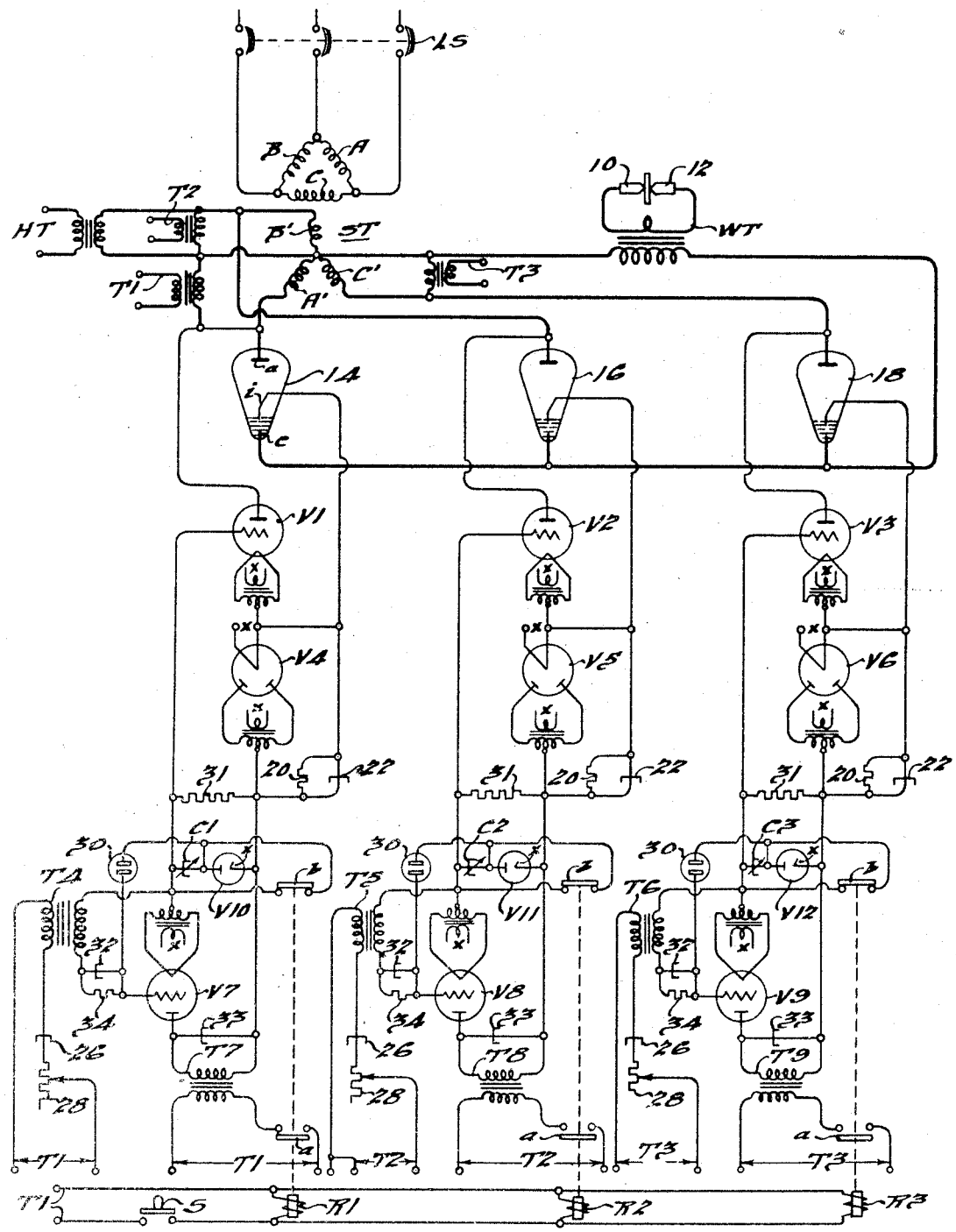

INVENTORS
Chester F. Leathers
Gustav E. Undy
BY
Harness, Dickey & Pierce
ATTORNEYS Patented Sept. 7, 1943

2,329,122

UNITED STATES PATENT OFFICE 2,329,122

WELDING METHOD AND APPARATUS

Chester Franklin Leathers and Gustav E. Undy, Detroit, Mich., assignors to Progressive Welder Company, Detroit, Mich., a corporation of Michigan Application January 17, 1941, Serial No. 374,952

9 Claims. (Cl. 171—97)

The present invention relates to electric distribution systems, and in particular provides an improved method of and apparatus for supplying a single phase welding circuit from a multiphase alternating current source.

The principal objects of the present invention are to provide a method and apparatus of the above general character, which is simple in arrangement, and reliable and efficient in operation; to provide such a method and apparatus, utilizing rectifying devices interposed between a multiphase source and a single phase welding circuit, in such relation that each impulse of current delivered to the welding circuit is equal to the summation of equal current components drawn from the individual phases of the source, whereby the welding load is equally distributed between the several phases of the source; to provide such a method and apparatus, wherein each successive current impulse delivered to the welding circuit represents the summation of one-half cycle of current flow in each individual phase of the source of supply; to provide such a method and apparatus, utilizing translating means interposed between the rectifiers and the source; to provide such a method and apparatus wherein the rectifying means are of the gaseous discharge type, and wherein the control means associated therewith function to limit each welding impulse to the summation of one half-cycle of each phase of the source.

With the above, as well as other and more detailed objects in view, which appear in the following description and in the appended claims, preferred but illustrative embodiments of the invention are shown in the accompanying drawings, throughout the several views of which corresponding reference characters are used to designate corresponding parts and in which:

Figure 1 is a diagrammatic view of a welding system embodying the invention;

Figures 2, 3, 4:
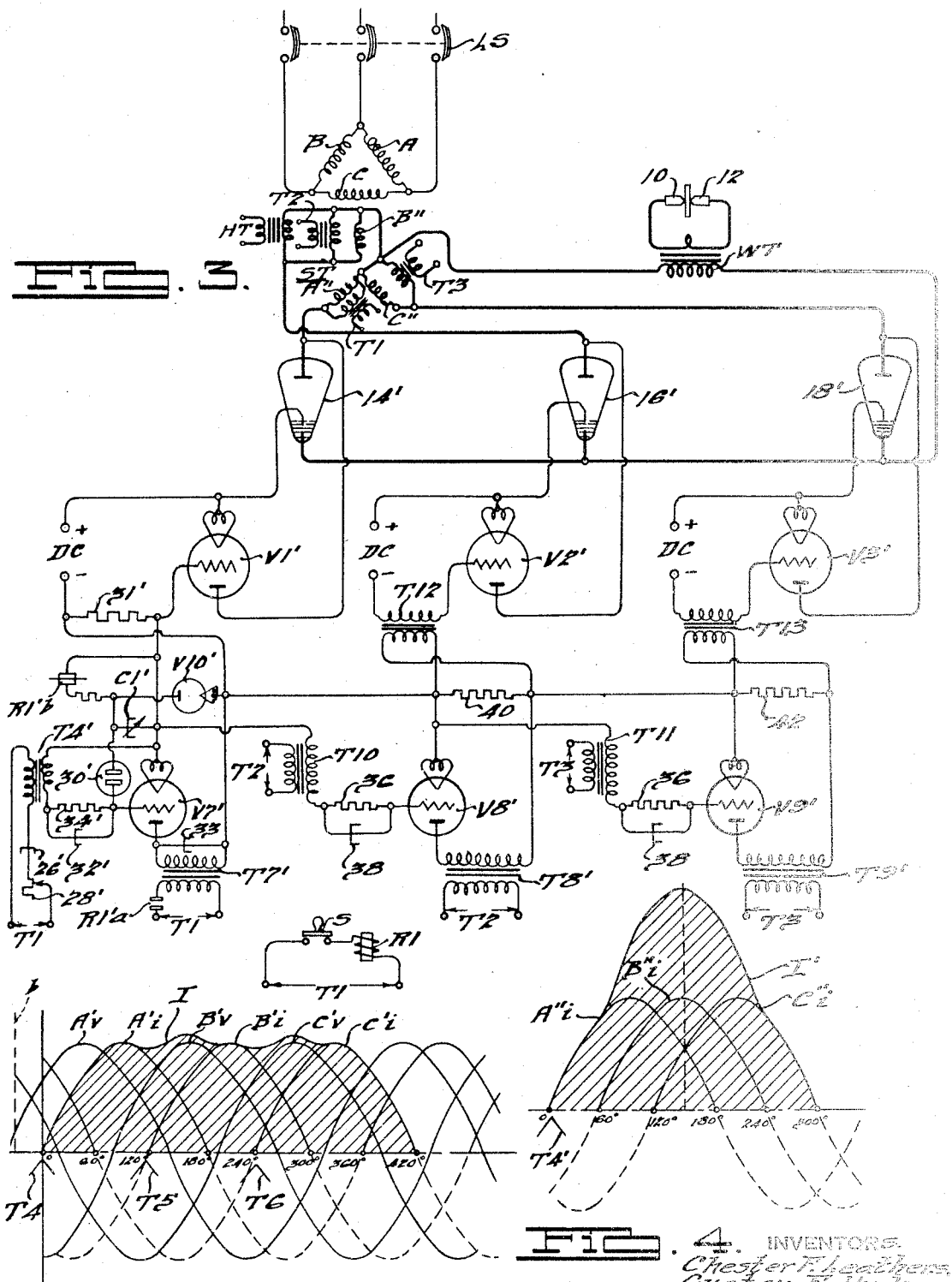
Fig. 2 is a diagrammatic view illustrative of current and voltage conditions in the system of Fig. 1.
Fig. 3 is a diagrammatic view of a welding system embodying a modification of the invention; and, Fig. 4 is a diagrammatic view illustrative of current conditions in the system of Fig. 3.

It will be appreciated from a complete understanding of the present invention that the improvements thereof may, in a generic sense, be utilized for a variety of specific purposes, and that various modifications may be made in the present apparatus, all without departing from the spirit of the invention. In the herein illustrated preferred forms, however, the invention is utilized for electric welding purposes.

Referring first to Fig. 1, the illustrative welding electrodes 10 and 12 are connected in a local circuit which includes the secondary winding of a usual welding transformer WT. The electrodes 10 and 12 may be variously constructed, depending upon the nature of the welding operation to be performed, and it will be understood that one or both of these electrodes may be retractable so as to enable the removal and insertion of the workpieces. Suitable means may also be provided to bias the electrodes 10 and 12 into engagement with the work.

The primary winding of the welding transformer WT is connected, through a series of three rectifiers 14, 16 and 18, to the respective secondary windings A', B' and C' of a conventional three-phase supply transformer ST. As shown, the secondary windings are star-connected and the primary windings A, B and C are connected in delta. The primary windings derive power from a usual three-phase supply circuit, under control of a usual line switch LS.

The rectifiers 14, 16 and 18 may be variously constructed, but are illustrated as being of the gaseous discharge type, each having an anode $a$, a cathode $c$ and an igniter electrode $e$. The cathodes $c$ are preferably of a reconstructing type, such as mercury, and the igniters are preferably permanently immersed in the corresponding cathodes. Rectifiers of this general type are well known in the art, and it will be understood that these rectifiers are normally non-conducting, but that, upon the application of a critical potential between the igniter and the cathode during a half-cycle in which the anode is positive with respect to the cathode, they become conducting and remain so for the balance of the corresponding half-cycle of current flow.

The hereinafter described control apparatus, associated with the individual rectifiers 14, 16 and 18, is such that each operation of a starting control device causes the rectifiers 14, 16 and 18 to be sequentially rendered conducting for all or a predetermined part of a half-cycle of current flow. The rectifiers are connected, parallel with each other, to one terminal of the primary winding of the welding transformer WT, and the other terminal of this winding is connected to the center point of the secondary winding of the supply transformer. The just-mentioned sequential actuation of the rectifiers 14, 16 and 18 consequently supplies the welding transformer WT with a single impulse of welding current, the instantaneous values of which are equal to the vectorial sums of currents flowing in the individual secondary windings A', B' and C'.

This relation is clearly indicated in Fig. 2, wherein the curve A'$i$ represents currents flowing in the secondary winding A'; curve B'$i$ represents currents flowing in the secondary winding B'; and curve C'$i$ represents currents flowing in the secondary winding C'. Corresponding voltage conditions are represented by the curves A'$v$, B'$v$ and C'$v$, and in view of the inductive character of the welding load, it will be understood that the current curves lag rather substantially behind the voltage curves.

As aforesaid, the control system is such that upon each actuation of the starting control device, the rectifiers 14, 16 and 18 are sequentially rendered conducting for all or a predetermined portion of one half-cycle of the corresponding phase. The curve I in Fig. 2 is representative of the resultant values of current flowing in the welding circuit, assuming that each rectifier is rendered conducting at the zero point of the corresponding current curve. A current wave of the form shown in Fig. 2 has been found particularly advantageous in electric welding processes, particularly those processes designed to weld metals of relatively low resistance, such as aluminum and certain of the alloys thereof now used in aircraft production. This is for the reason that the present arrangement enables the delivery through the work of a relatively large quantity of current in a relatively short space of time, the entire impulse of Fig. 2 being delivered in a period equal to 420 electrical degrees. Moreover, the utilization of the present three-phase source enables the current impulse to be derived from balanced components drawn from the individual phases, thus reducing the current values in each phase and also entirely overcoming the unbalance which is produced on three-phase lines by the operation of single phase welding systems.

In the broader aspects of the invention, any of a wide variety of control systems may be utilized to sequentially fire the individual rectifiers 14, 16 and 18, and to limit each actuation thereof to a single or a predetermined number of one half-cycles of the corresponding phase. The present system employs a series of three firing valves V1, V2 and V3, which are individual, respectively, to the rectifiers 14, 16 and 18, and the plate circuits whereof are connected to the corresponding rectifiers 14, 16 and 18 in the usual manner. The valves V1, V2 and V3 are preferably of the three-element gas filled type, and as will be understood, they are normally nonconducting, but may be rendered conducting, during half-cycles in which the anodes are positive with respect to the cathodes, by applying a critical potential between the grids and the cathodes thereof.

The valves V1, V2 and V3 are rendered normally nonconducting by appling a negative bias to the grids thereof by means of suitable fullwave rectifying circuits, comprising the rectifiers V4, V5 and V6 and associated adjusting elements 20 and 22. In order to fire the respective valves V1, V2 and V3, the just-mentioned negative grid biases are overcome by respectively placing the associated phase control valves V7, V8 and V9 in a conducting condition.

The valves V7, V8 and V9 are provided with grid control apparatus comprising the peaking transformers T4, T5 and T6, which apply conducting potentials to the grids of these valves at desired critical points in the appropriate halfcycles, and more than one firing action of each valve is prevented by condensers C1, C2 and C3 associated therewith.

It is thought that the remaining details of the present system may best be understood from a description of the operation of the system as a whole.

Assuming it is desired to effect a welding operation, the system may be conditioned for operation by closing the main switch LS, which energizes the supply transformer ST, which thereupon energizes a series of control transformers T1, T2 and T3, and a filament transformer HT. The secondary winding of transformer HT applies heating currents to the filaments of the previously mentioned valves V1 through V9, as well as to the filaments of the rectifiers V10, V11 and V12. This latter action serves, as will be appreciated, to enable the rectifiers V4, V5 and V6 to apply negative biases to the grids of the firing valves V1, V2 and V3, thereby rendering these latter valves non-conducting.

Transformers T1, T2 and T3 are associated, respectively, with the secondary phases A', B' and C', and supply energy for operating the control elements associated, respectively, with the corresponding rectifiers 14, 16 and 18. Grid transformers T4, T5 and T6, associated, respectively, with the phase control valves V7, V8 and V9, are directly connected to transformers T1, T2 and T3, respectively, and remain energized so long as the latter are energized. Plate transformers T7, T8 and T9 also are responsive, respectively, to the control transformers T1, T2 and T3, but the primary circuits thereof are subject to control by the relays R1, R2 and R3. These connections are indicated by the reference characters applied to the terminals of transformers T4 through T9.

As will be appreciated, transformer T4, for example, is effective during each alternate halfcycle of the voltage across phase A' to apply a positive or conducting potential to the grid of the valve V7, and the connections for transformer T7 are such that the latter, if energized, renders the anode of valve V7 positive with respect to the cathode thereof during the same half-cycle. The application of the conducting potential to the grid of valve V7 is, however, without effect unless the associated control relay R1 has previously been operated, as hereinafter described, to initiate a welding operation. Transformer T4 is preferably of the peaking type, so that the voltage thereof is sufficiently high to apply the necessary potential to the grid of valve V7 only during a relatively small fraction of the appropriate half-cycle, and in addition, transformer T4 is provided with conventional adjustable phase shifting elements 26 and 28. The latter may be adjusted to enable transformer T4 to apply the afore-mentioned conducting potential to the grid of valve V7 at any desired point along the voltage curve of phase A. In producing the current form shown by the shaded area in Fig. 2, it will be appreciated that this adjustment is such that valve V7 is rendered conducting at the hypothetical zero point of the current wave in the corresponding secondary phase A'. Similar comments apply to transformers T5 and T6 in relation, respectively, to valves V8 and V9.

With the system thus prepared for operation, and assuming that the work has been properly clamped between the electrodes 10 and 12, a welding operation may be initiated by closing the control device S, herein illustrated as a manually operable push button. Closure of the button S completes obvious energizing circuits for the windings of the usual electromagnetic relays R1, R2 and R3, which thereupon close their contact members $a$ and open their contact members $b$. The opening of contact members $b$ of the relays R1, R2 and R3 has no immediate effect except to open normally complete discharge circuits for the previously mentioned condensers C1, C2 and C3. Closure of the relay contacts R1$a$, R2$a$ and R3$a$ completes obvious energizing circuits for the primary windings of the plate transformers T4, T5 and T6. As will appear from a later description, the time of closure of the button S with respect to current conditions in the several phases is material only to the extent of determining which of the main rectifiers 14, 16 or 18 is the first to be rendered conducting. For the purposes of the present description, it may be assumed that the closure of the button S occurred at the time represented by the vertical line $b$ in Fig. 2. It will be observed that at the time in question the transformer T6, associated with the valve V9, has passed its critical potential and that the critical potential has not yet been developed by transformer T4. As soon, however, as transformer T4 develops its critical potential, and thereby renders valve V7 conducting, transformer T7 is enabled to pass current through the valve V7 in such relation that the potential across the resistor 31 overcomes the normal negative bias on the grid of the valve V1. In response to this action, valve V1 becomes conducting, and thereby enables the secondary phase A' to apply a firing potential between the igniter electrode $i$ and the cathode $c$ of the rectifier 14. In response to this action, which occurs, with the preferred adjustment, at the zero point of the curve A'$i$ (Fig. 2), rectifier 14 is rendered conducting and a current flow is initiated through winding A' of the supply transformer ST, rectifier 14 and the primary winding of the welding transformer WT. At a time displaced 120 electrical degrees from the actuation of valve V7, transformer T5, associated with valve V8, reaches its critical potential and renders valve V8 conducting. At this time, transformer T8 is enabled to pass current through valve V8 in such relation that the drop across the associated resistor 31 overcomes the negative grid bias of valve V2, which thereupon fires the main rectifier 16 in the manner just described with reference to rectifier 14. As soon as this action occurs, current is delivered to the primary winding of the welding transformer through two parallel circuits which include, respectively, transformer winding A' and rectifier 14, and transformer winding B' and rectifier 16.

At a time displaced 120 electrical degrees from the last-mentioned action, transformer T6 becomes effective to render valve V9 conducting, at which time transformer T9 becomes effective to render valve V3 conducting. The latter action fires the main rectifier 18 in the above-described manner. At the time rectifier 18 is rendered conducting, the half-cycle of current flow through rectifier 14 has terminated, but the firing of rectifier 18 causes current to be supplied to the welding transformer WT through two parallel circuits including, respectively, transformer winding B' and rectifier 16, and transformer winding C' and rectifier 18.

The actuation of valve V7 also enables the transformer T7 to charge the associated condenser C1 through an obvious circuit which includes valve V7, the secondary winding of transformer T7, the associated rectifier V10 and condenser C1. The proportioning of the parts is such that the full charge on condenser C1 is reached after the expiration of a relatively small fraction of a half-cycle after the actuation of valve V7, and as the charge on condenser C1 approaches its full value, the potential thereof becomes sufficient to break down a usual two-element discharge tube 30. As soon as the latter action takes place, condenser C1 is enabled to apply a blocking potential to the grid of valve V7. The initial firing of valve V7, therefore, applies a blocking potential to the grid thereof which, while not affecting the flow of current therethrough during the balance of the half-cycle in question, does prevent the valve from again being rendered conducting during any subsequent half-cycle, until condenser C1 is discharged, as hereinafter described. Condensers C2 and C3, associated with valves V8 and V9, are correspondingly enabled to apply blocking potentials to the grids of the latter valves. With this relation, each closure of the starting device S is enabled to effect one firing action of each of valves V7, V8 and V9, which firing action, however, applies blocking potential to these valves, thereby preventing more than one firing action of each thereof.

The blocking of valves V7, V8 and V9 renders the transformers T7, T8 and T9 ineffective to overcome the normal negative biases on the grids of valves V1, V2 and V3, which thereupon again become non-conducting immediately after having fired their associated rectifiers 14, 16 and 18, as described above.

At the conclusion of each corresponding half-cycle of current flow, the rectifiers 14, 16 and 18 again become non-conducting, as will be understood, and remain so until the critical firing potential is again applied to the igniter electrodes thereof so that the aforesaid closure of the push button S is effective only to transmit to the welding transformer an impulse of current which represents the vectorial sum of a half-cycle of current flow in each of the phases of the supply transformer.

The push button S may be released at any time after the termination of the above single impulse of current flow to the welding transformer WT. The opening of push button S immediately de-energizes the relays R1, R2 and R3, which thereupon resume their illustrated positions, opening their contacts $a$ and closing their contacts $b$. The opening of contacts $a$ of the respective relays R1, R2 and R3 de-energizes the plate transformers T7, T8 and T9, and as illustrated, condensers 33 may be utilized to suppress any surge tendencies otherwise resulting from such de-energization. Closure of contacts $b$ of relays R1, R2 and R3 completes obvious discharge circuits for the previously mentioned condensers C1, C2 and C3, respectively. These discharge circuits, as will be understood, eliminate the blocking potentials previously applied to the grids of valves V7, V8 and V9, thereby placing the system in readiness for a succeeding welding operation, which may be initiated, as before, by closure of the button S.

It will be noticed that if closure of button S occurs after transformer T4 has passed its critical potential, but before transformer T5 has developed its critical potential, valve V8 will be the first one of the series to be actuated, and the main rectifiers will consequently be rendered conducting in the order 16—18—14, instead of in the order previously described. Similarly, if the button S is closed so that valve V9 is the first one of the series to be rendered conducting, the main rectifiers will be rendered conducting in the order 18—14—16. In any event, however, each closure of the push button S causes a single firing of each of the main rectifiers 14, 16 and 18.

It will be recognized that, if desired, the phase shifting elements associated with the transformers T4, T5 and T6 may be adjusted, either individually or together, so as to delay the firing points of the several main rectifiers 14, 16 and 18, thereby limiting the firing time of these rectifiers to a desired fraction of the full half-cycle described above, and correspondingly reducing the quantity of current delivered to the welding circuit during each complete welding cycle.

In the modified embodiment of the invention shown in Fig. 3, the operation is the same to the extent that each operation of the starting control switch S' causes the delivery to the welding circuit of a quantity of current equal to the vectorial sum of the currents flowing in the individual phases during all or a desired part of the half-cycle of each individual phase. In the system of Fig. 3, however, the connections for the secondary phase B" are reversed, in the relation shown diagrammatically in Fig. 4, thereby producing a welding current impulse of the general form depicted by the curve I' in Fig. 4. It will be noticed that the curve I' has a higher peak value than the corresponding curve I in Fig. 2, and also, that the impulse represented by the curve I' is delivered in a shorter interval of time, namely, in an interval corresponding to 300 electrical degrees as compared to the interval of 420 electrical degrees for the impulse represented by the curve I in Fig. 2. Referring more particularly to Fig. 3, the rectifiers 14', 16' and 18' are connected parallel to each other, in the previously described manner, with the cathodes thereof permanently connected to one terminal of the primary winding of the welding transformer. The other terminal of the just-mentioned primary winding is connected to the center point of the secondary winding of the supply transformer ST, and individual secondary windings are connected to the anodes of the respective rectifiers. In this instance, the connections for the secondary winding B" are reversed, however, and the control system is such that the firing of rectifier 16' is displaced 60 electrical degrees after the firing of the rectifier 14'. In turn, the firing of rectifier 18' is displaced 60 electrical degrees after the firing of the rectifier 16'.

As shown, the firing of the individual rectifiers 14', 16' and 18' is controlled by a series of gas filled firing valves V1', V2' and V3' which may duplicate the valves V1, V2 and V3. These valves, as before, are normally rendered non-conducting by applying a negative bias to the grids thereof, and for this purpose, elements corresponding to the previously described rectifiers V4, V5 and V6, together with the associated elements 20 and 22, may be employed. In Fig. 3, the means for applying the negative bias is diagrammatically indicated by the letters DC. As before, also, the just-mentioned negative bias is overcome by selectively rendering the phase control valves V7', V8' and V9' conducting, and in this instance, the valves V8' and V9' are actuated as a consequence of the previous actuation of the valve V7'. With this arrangement, each impulse of current is initiated by the firing of the main rectifier 14' and is terminated at the conclusion of the firing period of the rectifier 18'.

It is thought that the remaining details of Fig. 3 may best be understood from a description of the operation thereof. Assuming it is desired to effect welding operation, the line switch LS may be closed, as before, thereby energizing the supply transformer ST and consequently energizing control transformers T1, T2 and T3 and the filament transformer HT. The filament transformer HT applies heating current to the several valves, as before. The transformers T1, T2 and T3 directly energize the transformers T4', T10 and T11, associated respectively with the grids of the valves V7', V8' and V9'. In addition, transformer T1 prepares an energizing circuit for the primary winding of plate transformer T7', associated with valve V7'. It will be understood that, as before, so long as transformer T1 is energized, transformer T4' functions to apply, during alternate half-cycles, a conducting potential to the grid of valve V7', which action is, however, without effect, so long as relay contacts R1'a are open. Transformers T2 and T3 also directly energize the primary windings of transformers T8' and T9', associated with the plate circuits of valves V8' and V9'. This action is, however, without immediate effect for the reason that the continuously energized transformers T10 and T11 are effective, under the conditions stated, to apply blocking potentials to the grids of valves V8' and V9'.

With the system thus prepared for operation, a welding operation can be initiated by closing the starting switch S, which completes an obvious connection, to the control transformer T1, for the relay R1'. Upon the completion of this circuit, relay R1' closes its contact R1'a and opens its contact R1'b. As before, the opening of the latter contact serves only to interrupt the normally complete discharge circuit for the condenser C1', associated with valve V7'.

The closure of relay contact R1'a energizes the transformer T7'. Consequently, as will be understood from previous description, at a critical stage of the next half-cycle of phase A", in which the anode of valve V7' is positive with respect to the anode thereof, transformer T4' renders valve V7' conducting. In response to this action, transformer T7' is enabled to apply a potential across the control resistor 31', which overcomes the negative grid bias on valve V7', and renders the latter conducting. This action, which may be timed, as before, to occur at the hypothetical zero point of the current wave in the secondary phase A", fires the main rectifier 14' and initiates a flow of current through phase A" to the welding circuit.

As before, the passage of current through the valve V7' charges the condenser C1', enabling the latter to break down the discharge tube 30' and apply a blocking potential to the grid of valve V7'. This action does not alter the current flowing through valve V7' during the half cycle in question, but it does prevent these valves from being rendered conducting during the next half-cycle of similar polarity, even though the button S is maintained closed.

As will be evident, the grid and cathode of valve V8' are connected, through the blocking transformer T', to the plate circuit of valve V7', and are consequently in parallel with the resistor 31'. The potential across resistor 31' opposes the potential of transformer T10. Consequently, the potential built up across the resistor 31, upon actuation of valve V7', overcomes the bias of transformer T10' and applies a conducting potential to the grid of valve V8'. This action occurs, with respect to the actuation of valve V7', after a time displacement determined by the relative values of opposing potentials in the circuit for the grid of valve V8'. Preferably, the adjustment is such that valve V8' is rendered conducting 60 electrical degrees after the actuation of valve V7'.

The actuation of valve V8' enables the transformer T8' to energize the grid transformer T12, associated with valve V2', in such relation as to overcome the normal negative grid bias on this valve and render the latter conducting. This action, as will be understood, fires the rectifier 16'.

The actuation of valve V8' enables transformer T8' to build up a potential across resistor 40, which opposes the bias of transformer T11 and which overcomes the negative bias normally applied to the grid of valve V9 by transformer T11 in substantially the same manner as described in connection with the actuation of valve V8'. Consequently, at an acurately determinable time after the actuation of valve V8', preferably 60 electrical degrees, valve V9' is rendered conducting, thereby enabling transformer T9' to energize transformer T13'. The latter action fires valve V3' which, in turn, fires the associated main rectifier 18'.

As aforesaid, valve V7' remains conducting only during the balance of the corresponding half-cycle, and so is enabled to deliver only one actuating impulse to valve V8'. Similarly, after having been rendered conducting, valve V8' remains so only throughout the balance of the corresponding half-cycle and thus is enabled to supply only one actuating impulse to valve V9. The closure of the starting button S consequently causes only a single firing action of the series of rectifiers 14, 16 and 18.

In addition, determining the firing point of valve V9', resistor 40 acts to suppress any surges from transformer T12 when the latter is deenergized, and resistor 42 acts similarly in relation to transformer T13.

The button S may be released at any time after the termination of the welding impulse and such action reopens the relay contacts R1'a, thereby de-energizing the transformer T7', and also recloses the contacts R1'b. The latter action completes the discharge circuit for the condenser C1', thereby conditioning the system for a subsequent operation, which may be initiated, as before, by reclosing the starting button S.

It will be appreciated that various changes in the invention, as herein specifically disclosed, may be made without departing from the spirit and scope of the invention.

What is claimed is:

1. In a system for supplying current to a work circuit from a multiphase alternating current supply source the several phases whereof are displaced but overlap as to time, the combination of rectifying means connected to each phase for delivering fractional cycles of current of like polarity from the individual phases which overlap as to time, a single phase transformer connected to receive the output of said rectifiers, and means connecting said work circuit to receive the output of said transformer.

2. In a system for supplying current to a work circuit, the combination of a multiphase transformer having at least one phase reversely connected so as to reduce the time displacement between the phases, rectifying means connected to the individual phases for delivering half-cycles of like polarity from the several phases, a single phase transformer connected to receive the output of said rectifying means, and means electrically connecting said work circuit to said last mentioned transformer.

3. In a system for supplying current to a work circuit from a multiphase alternating current supply source the several phases whereof are displaced but overlap as to time, the combination of rectifying means connected to each phase for delivering fractional-cycles of current of like polarity from the individual phases which overlap as to time, a single phase transformer connected to receive the output of said rectifying means, means connecting said work circuit to receive the output of said transformer, and control means for limiting the flow of current through each rectifier to not more than one half-cycle of the corresponding phase.

4. In a system for supplying current to a work circuit, the combination of a multiphase transformer having at least one of the phases reversely connected so as to reduce the time displacement between the phases, rectifying means connected to the individual phases for delivering fractional cycles of like polarity from the several phases, a single phase transformer connected to receive the output of said rectifying means, means electrically connecting said work circuit to said last mentioned transformer, and control means for limiting the flow of current through each rectifier to not more than one half-cycle of the corresponding phase.

5. In a system for supplying current to a work circuit from a multiphase alternating current supply source, the several phases whereof are displaced but overlap as to time, the combination of a multiphase transformer means having primary windings connected to said phases and having secondary windings, a rectifier in series with each said secondary winding, a single phase transformer having a secondary winding coupled to said work circuit and having a primary winding, means connecting said rectifiers in parallel relation to each other and in series relation to said last-mentioned primary winding, and means for successively rendering said rectifiers conductive throughout fractional-cycles of like polarity which overlap as to time so as to deliver to the work circuit current impulses which represent the summation of currents flowing in the several phases.

6. In a system for supplying current to a work circuit from a multiphase alternating current supply source, the several phases whereof are displaced but overlap as to time, the combination of a multiphase transformer means having primary windings connected to said phases and having secondary windings, one of the windings of said multiphase transformer being reversely connected so as to reduce the time displacement between currents flowing in the several secondary windings, a rectifier in series with each said secondary winding, a single phase transformer having a secondary winding coupled to said work circuit and having a primary winding, means connecting said rectifiers in parallel relation to each other and in series relation to said last-mentioned primary winding, and means for successively rendering said rectifiers conductive throughout fractional-cycles of like polarity which overlap as to time so as to deliver to the work circuit current impulses which represent the summation of currents flowing in the several phases.

7. In apparatus for supplying a work circuit from a multiphase alternating current source, translating means associated with the source for reducing the time displacement between the phases of the source, and rectifying means coupled between the translating means and the work circuit for delivering to the work circuit impulses representing the summation of currents flowing in said phases.

8. In apparatus for supplying a work circuit from a multiphase alternating current source, translating means associated with the source for reducing the time displacement between the phases of the source, rectifying means coupled between the translating means and the work circuit for delivering to the work circuit impulses representing the summation of currents flowing in said phases, and control means for limiting the output of each phase to not more than one half cycle so as to effect the delivery to the work circuit of a single said impulse in response to each actuation of said control means.

9. In a system for supplying current to a work circuit from a supply source having a plurality of phases, the voltages whereof periodically pulsate between maximum and minimum values and which are displaced but overlap relative to each other as to time, means for delivering the combined current outputs of said phases to said work circuit as an impulse representing the summation of currents flowing in the several phases, and control means for actuating said delivery means and for limiting said delivery to not more than one said pulsation of each phase.

CHESTER FRANKLIN LEATHERS.
GUSTAV E. UNDY.